United States Patent
Mäkisalo et al.

(10) Patent No.: US 8,833,505 B2
(45) Date of Patent: Sep. 16, 2014

(54) ARTICULATED TRANSPORT EQUIPMENT AND TRAILER FOR ARTICULATED TRANSPORT EQUIPMENT

(75) Inventors: Kari Mäkisalo, Kalanti (FI); Aleksei Tschurbanoff, Turku (FI)

(73) Assignee: Sandvik Mining and Construction Oy, Tampere (FI)

( * ) Notice: Subject to any disclaimer, the term of this patent is extended or adjusted under 35 U.S.C. 154(b) by 96 days.

(21) Appl. No.: 13/580,785

(22) PCT Filed: Feb. 21, 2011

(86) PCT No.: PCT/FI2011/050155
§ 371 (c)(1),
(2), (4) Date: Aug. 23, 2012

(87) PCT Pub. No.: WO2011/104435
PCT Pub. Date: Sep. 1, 2011

(65) Prior Publication Data
US 2012/0312617 A1  Dec. 13, 2012

(30) Foreign Application Priority Data

Feb. 24, 2010 (FI) .................................. 20105178

(51) Int. Cl.
| | | |
|---|---|---|
| *B62D 13/00* | (2006.01) | |
| *B62D 53/02* | (2006.01) | |
| *B62D 12/00* | (2006.01) | |
| *B62D 53/08* | (2006.01) | |

(52) U.S. Cl.
CPC ............... *B62D 53/02* (2013.01); *B62D 1/665* (2013.01); *B62D 12/00* (2013.01); *B62D 13/005* (2013.01); *B62D 53/0864* (2013.01)

USPC .......................... 180/419; 180/14.2; 280/426

(58) Field of Classification Search
CPC ...... B60D 1/665; B62D 12/00; B62D 13/005; B62D 53/02; B62D 53/0864
USPC .......... 180/418, 419, 420, 14.2; 280/426, 442
See application file for complete search history.

(56) References Cited

U.S. PATENT DOCUMENTS 4,688,818 A * 8/1987 Grassmuck ................... 280/432
5,364,116 A   11/1994 Houle et al.
(Continued)

FOREIGN PATENT DOCUMENTS

CA    898851    4/1972
DE    158222    1/1983
(Continued)

OTHER PUBLICATIONS

Runko-ohjattu Dumpperi, http://www.witraktor.fi/rental/Vuokrattavat_koneet/fi_FI/Dumpperit/, 2005.
(Continued)

*Primary Examiner* — Kevin Hurley
(74) *Attorney, Agent, or Firm* — Morgan, Lewis & Bockius LLP

(57) ABSTRACT

The present invention relates to removal of excavated rock material in mine and underground as well as surface excavation, and particularly to transport equipment suitable for transporting excavated rock material. The transport equipment suitable for transporting excavated rock material according to the invention comprises a trailer connectable to a body of the transport equipment by a fastening articulation, the trailer comprising a body of the trailer, a transport box of the trailer, and a plurality of wheels of which at least two are arranged to be steerable wheels.

14 Claims, 11 Drawing Sheets

(56) References Cited

U.S. PATENT DOCUMENTS

| | | | |
|---|---|---|---|
| 5,700,023 A | 12/1997 | Picard | |
| 6,299,181 B1 * | 10/2001 | Ericksson | 280/6.156 |
| 7,798,262 B2 * | 9/2010 | Lundstrom | 180/14.1 |
| 2005/0230934 A1 | 10/2005 | Wilt | |

FOREIGN PATENT DOCUMENTS

| | | |
|---|---|---|
| EP | 1 847 442 | 10/2007 |
| JP | 2002-46533 | 2/2002 |
| RU | 598790 | 3/1978 |
| RU | 912580 | 3/1982 |
| RU | 2 297 756 C2 | 4/2007 |
| RU | 2316444 C1 | 2/2008 |
| SU | 521175 A1 | 7/1976 |
| SU | 559854 A1 | 5/1977 |
| SU | 1794782 A2 | 2/1993 |
| WO | 2008/097146 | 8/2008 |

OTHER PUBLICATIONS

International Search Report for PCT/FI2011/050155 dated May 10, 2011.
Finnish Search Report for Application No. 20105178 dated Aug. 24, 2010.
Kazakhstan: Office Action for Kazakhstan Patent Application No. 2012/1622.1—Issued by the National Institute of Intellectual Property (NIIP) on Jan. 6, 2014 (Including English Translation).
Official Action (with English translation) for Russian Patent Application No. 2012140490/11(065430), dated Oct. 22, 2013.

* cited by examiner

ARTICULATED TRANSPORT EQUIPMENT AND TRAILER FOR ARTICULATED TRANSPORT EQUIPMENT

FIELD OF THE INVENTION

The invention relates to removal of excavated rock material in mine and underground as well as surface excavation, and particularly to transport equipment suitable for transporting excavated rock material.

BACKGROUND OF THE INVENTION

In mine and underground as well as surface excavation, various mobile mining machines, such as rock drilling rigs, loading and transport equipment, are employed. The rock drilling rigs are used for drilling and excavating various mining tunnels in the rock. A rock material, e.g. ore material, formed in underground excavation during rock drilling has to be removed from the mine. For the removal of the rock material, rail transport or increasingly popular railless removal suitable for several targets of use and carried out by mining machines may be used. Surface excavation, too, presents various transport needs relating to removal of excavated rock material.

Mining machines employed in the removal of rock material are loading and transport equipment. In mine and underground excavation, the most common loading equipment includes LHD (Load Haul Dump) loaders or dump trucks that load the rock material from an excavation into their bucket and transport it further to a loading point. In the loading point of the mine, the LHD loaders load the rock material to a crusher, transport wagon, conveyor belt or to railless transport equipment, such as a dump truck.

Transport equipment designed for mines and underground excavation are common mining machines used for railless removal of rock material. Typical transport equipment includes articulated or fixed-body transport equipment. Typically, prior art articulated transport equipment is two-axle or three-axle transport equipment, and their body is typically provided with one centre articulation rotating about a vertical axle. Typically, the prior art fixed-body transport equipment is three-axle or more-than-three-axle transport equipment wherein one or more of the axles are steering axles.

In mine and underground excavation, the transport equipment is expected to have a great load-bearing capacity in order to be able to remove the rock material as effectively as possible. On the other hand, the transport equipment is to be designed such that it can conveniently move and turn in the relatively narrow mining tunnels.

A disadvantage of the current prior art transport equipment solutions is thus that their load-bearing capacity is not sufficient in relation to the space required for turning in a mining tunnel. In addition, the stability of the prior art transport equipment is poor, particularly with heavier loads. The prior art transport equipment, upon being turned, may topple in a jack-knife position. Further, in the prior art transport equipment, the body structure should be designed separately for differently-sized transport equipment, and it is impossible to utilize similar body structures in transport equipment having different bearing capacities.

In mine and underground as well as surface excavation, a clear need and demand thus exist for novel transport equipment solutions which enable a sufficient load-bearing capacity to be achieved and the space required for turning in a mining tunnel to be reduced.

BRIEF DESCRIPTION OF THE INVENTION

An object of the present invention is to provide novel articulated transport equipment and a trailer for the articulated transport equipment.

Transport equipment suitable for transporting excavated rock material according to the invention is characterized in that the transport equipment comprises a mobile transport equipment body provided with a plurality of wheels, of which at least one is a drive wheel, and a transport equipment centre articulation which divides the body of the transport equipment into a front body part and a rear body part such that the transport equipment further comprises a trailer connectable to the body of the transport equipment by a fastening articulation, the trailer comprising a trailer body, a trailer transport box, and a plurality of wheels of which at least two wheels are arranged to be steerable wheels.

A trailer for transport equipment suitable for transporting excavated rock material according to the invention is characterized in that the trailer is connectable to the body of the transport equipment by a fastening articulation, and that the trailer comprises a trailer body, a trailer transport box, and a plurality of wheels of which at least two are arranged to be steerable wheels.

An improved solution for an articulated transport equipment and an improved trailer solution for an articulated transport equipment are now provided. The solution is characterized by what is stated in the independent claims. Some preferred embodiments of the invention are disclosed in the dependent claims.

The present invention provides several advantages, which become more apparent in the detailed description. The articulated transport equipment according to the invention enables an extremely good load-bearing capacity and a small space required for turning in a mining tunnel. The articulated transport equipment according to the invention is also very stable and has a good centre of gravity in a jack-knife position as well, which prevents the load from falling over.

BRIEF DESCRIPTION OF THE FIGURES

Some embodiments of the invention are now described in closer detail in connection with some preferred embodiments and with reference to the accompanying drawings, in which.

DETAILED DESCRIPTION OF EMBODIMENT OF THE INVENTION

Figure 1:
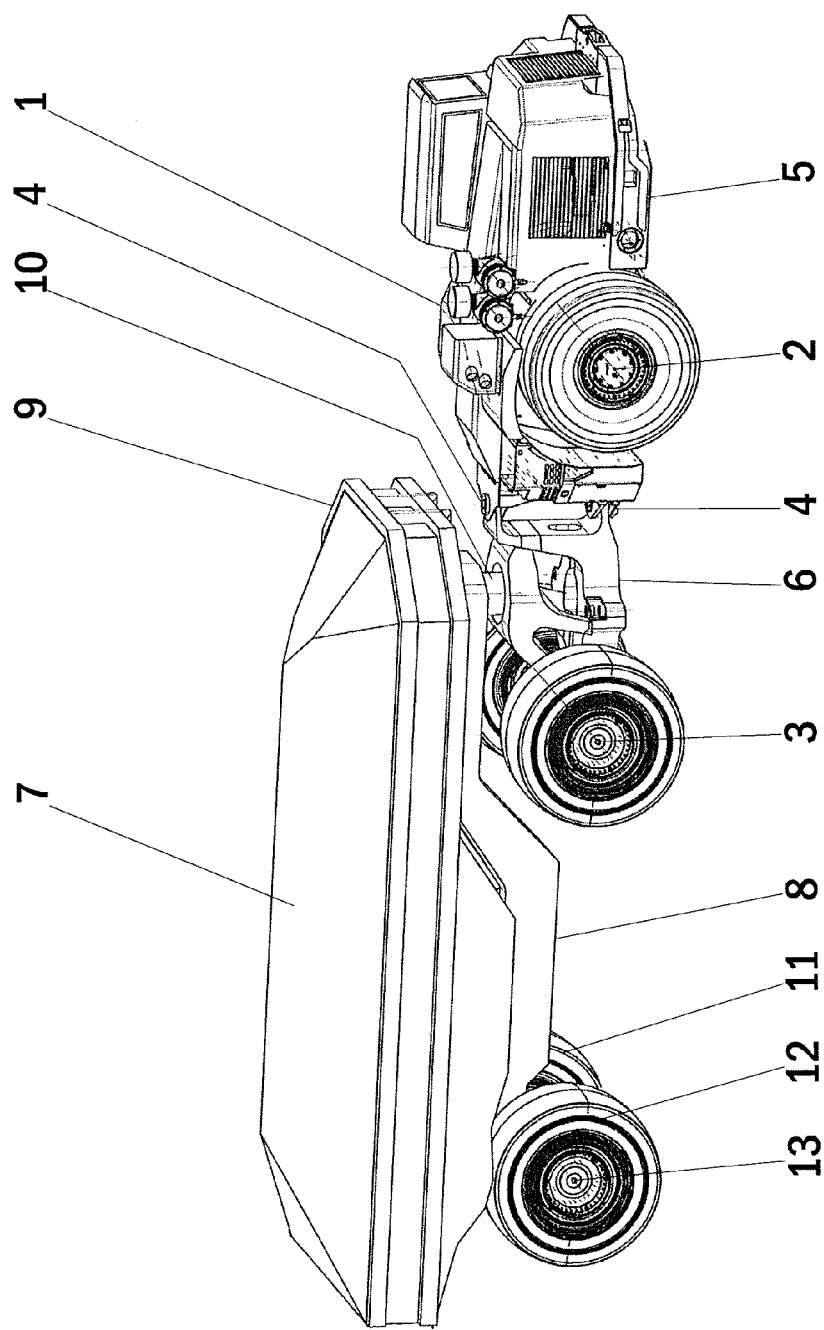
FIG. 1 shows a structure of articulated transport equipment according to an embodiment of the invention.

FIG. 1 shows a structure of articulated transport equipment according to an embodiment of the invention. The transport equipment comprises a mobile transport equipment body 1 provided with a plurality of wheels, of which at least one is a drive wheel drivable by a motor of the transport equipment via transmission. The wheels of the transport equipment may be arranged such that the wheels provided on both sides of the transport equipment form at least one front axle 2 and at least one rear axle 3. The transport equipment may also comprise a transport equipment centre articulation 4, which divides the body 1 of the transport equipment into a front body part 5 and a rear body part 6. The steering of the transport equipment according to the disclosed embodiment of the invention may be implemented such that the front body part 5 and the rear body part 6 of the body 1 are steered to rotate about the centre articulation 4 with respect to one another by means of articulated steering. The transport equipment according to the disclosed embodiment of the invention also comprises a trailer 7 which comprises a body 8 of the trailer and a transport box 9 of the trailer. The body 8 of the trailer is connected to the body 1 of the transport equipment by a fastening articulation 10 of the trailer. The trailer 7 is provided with a plurality of wheels of which at least two are arranged to be steerable wheels 11 to 12. The steerable wheels 11 to 12 of the trailer may be arranged such that the steerable wheels 11 to 12 of the trailer provided on both sides of the body 8 of the trailer form at least one axle 13 of the trailer. The trailer may also comprise more than one axle. The steerable wheels 11 to 12 of the trailer may also be arranged on both sides of the body 8 of the trailer such that each of the steerable wheels 11 to 12 of the trailer is fastened to the body 8 of the trailer by an axle shaft of its own.

Figure 2:
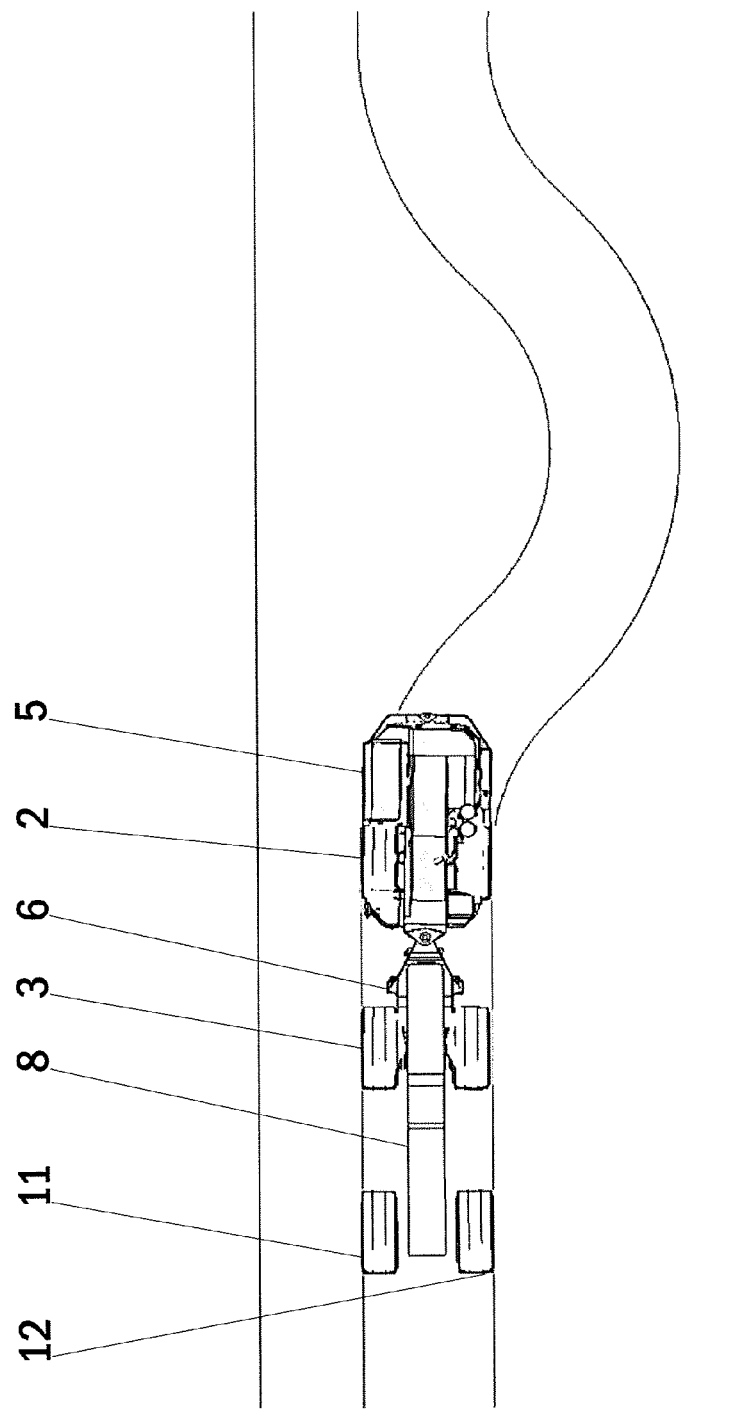
FIG. 2 illustrates, as seen from above, progress of articulated transport equipment according to an embodiment of the invention when being driven straight ahead.

FIG. 2 illustrates, as seen from above, progress of articulated transport equipment according to an embodiment of the invention when it is driven straight ahead. When driving the articulated transport equipment according to the invention straight ahead, the front body part 5 and the rear body part 6 of the transport equipment progress sequentially straight ahead and, in such a case, also the front axle 2 and the rear axle 3 of the transport equipment reside perpendicularly to the direction of progress of the transport equipment.

When driving the transport equipment straight ahead, the body 8 of the trailer of the transport equipment follows the successively progressing front body part 5 and the rear body part 6 of the transport equipment, advancing straight ahead. In such a case, the steerable wheels 11 to 12 of the trailer also follow the direction of movement such that an axis they form is perpendicular to the direction of progress of the transport equipment. For the sake of clarity, the figure shows the trailer of the transport equipment with no transport box.

Figure 3:
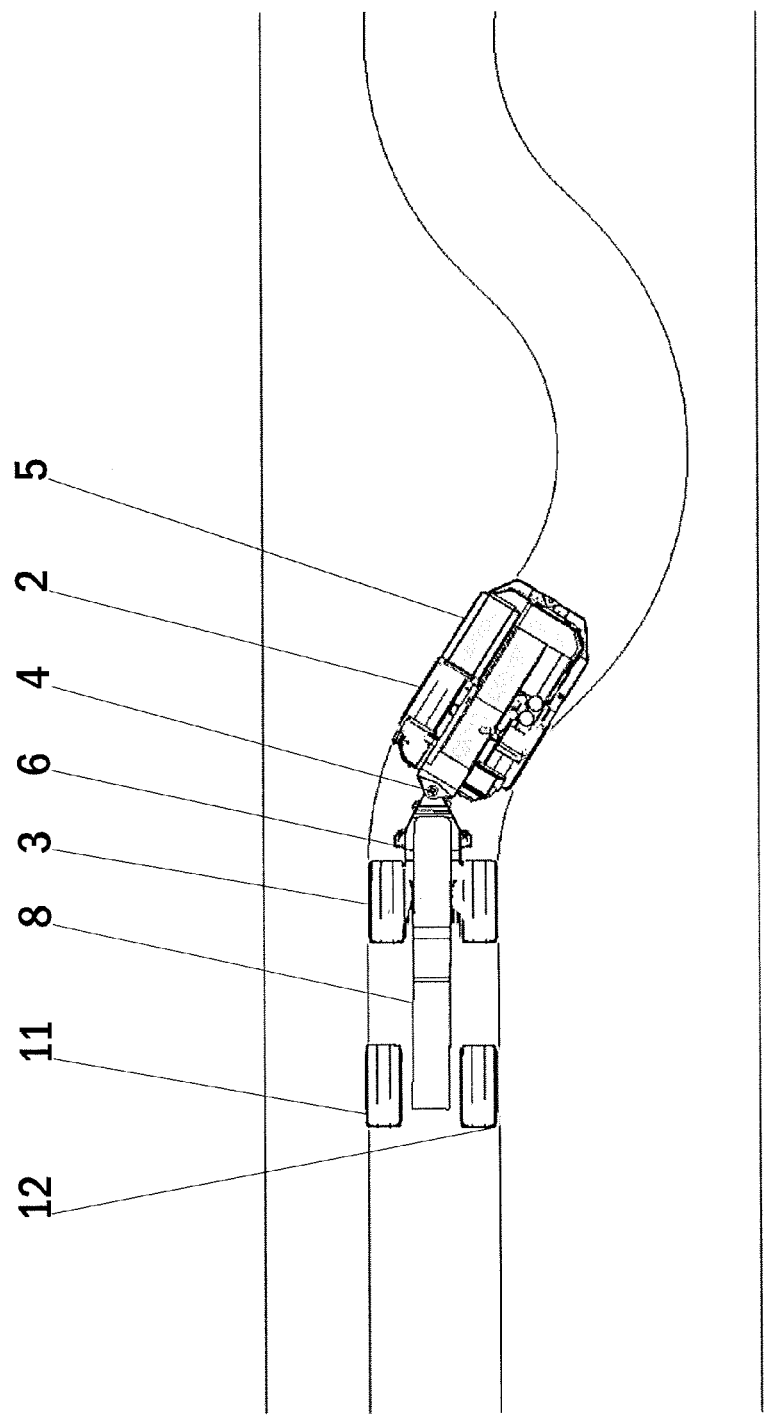
FIG. 3 illustrates, as seen from above, progress of articulated transport equipment according to an embodiment of the invention when it starts to turn to the right.

FIG. 3 illustrates, as seen from above, progress of articulated transport equipment according to an embodiment of the invention when it starts to turn to the right. When starting to turn to the right, the articulated transport equipment according to the invention turns by its centre articulation 4 such that the front body part 5 of the transport equipment turns to the right, as seen from above clockwise with respect to the rear body part 6. In such a case, the front axle 2 of the transport equipment has turned to the right, as seen from above clockwise, while the rear axle 3 is still substantially perpendicular to the previous direction of progress of the transport equipment. When starting to turn to the right, the body 8 of the trailer of the transport equipment follows the rear body part 6 of the transport equipment straight in the previous direction of progress. In such a case, the steerable wheels 11 to 12 of the trailer also follow the direction of movement such that the axis they form is perpendicular to the previous direction of progress of the transport equipment. For the sake of clarity, the figure shows the trailer of the transport equipment with no transport box.

Figure 4:
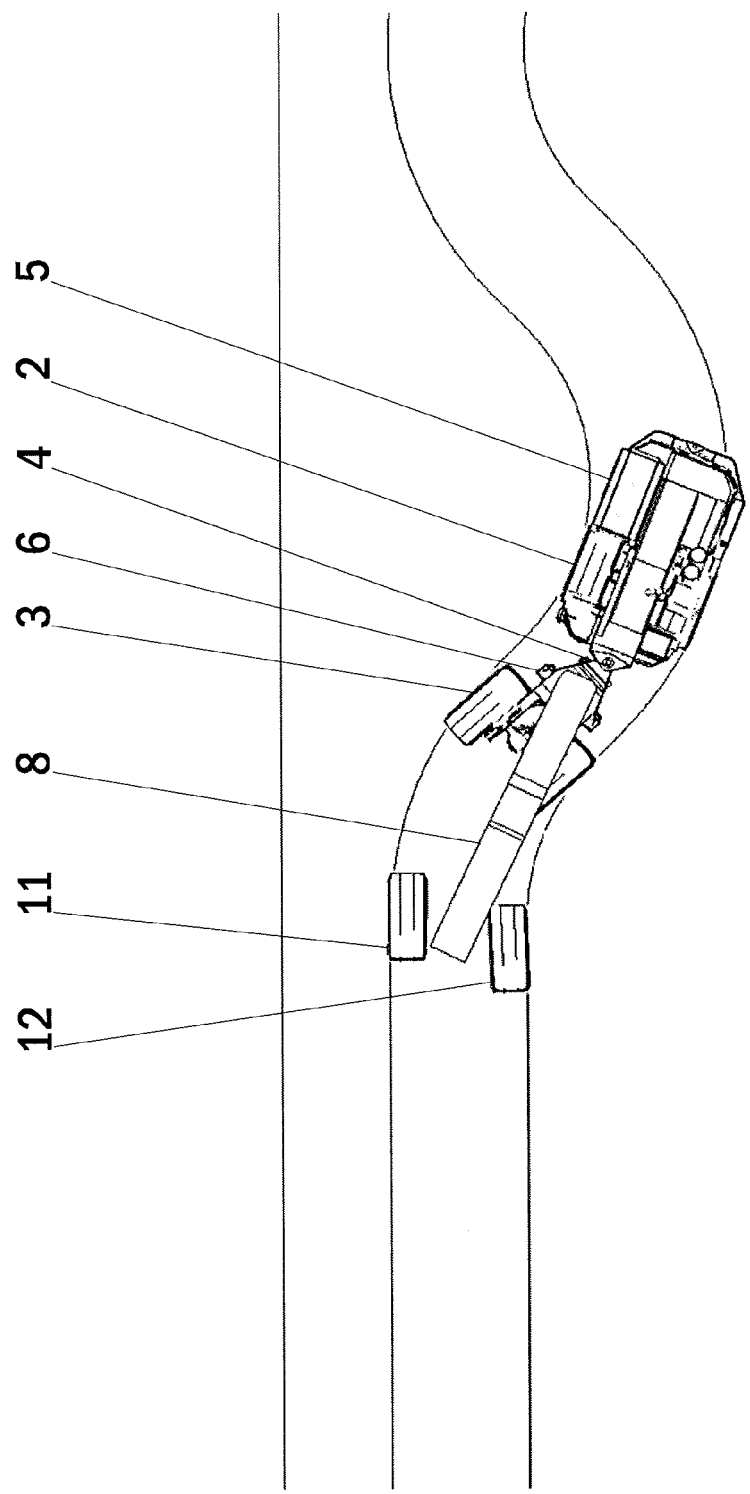
FIG. 4 illustrates, as seen from above, progress of articulated transport equipment according to an embodiment of the invention when it turns to the right.

FIG. 4 illustrates, as seen from above, progress of articulated transport equipment according to an embodiment of the invention when it turns to the right. When turning to the right, the articulated transport equipment according to the invention first turns by its centre articulation 4 such that the front body part 5 of the transport equipment turns to the right, as seen from above, clockwise with respect to the rear body part 6, whereafter the transport equipment turns by its centre articulation 4 back such that the front body part 5 of the transport equipment returns anti-clockwise to be substantially parallel with respect to the rear body part 6. In such a case, the front axle 2 and the rear axle 3 of the transport equipment are substantially perpendicular to the direction of progress of the transport equipment. In FIG. 4, the front body part 5 has already slightly turned to the left, owing to a new curve to the left.

When turning to the right, in the articulated transport equipment according to the invention the body 8 of the trailer of the transport equipment follows the rear body part 6 of the transport equipment and turns to the right with respect to the previous direction of progress. In such a case, the steerable wheels 11 to 12 of the trailer of the articulated transport equipment according to the invention are steered to turn to the left, as seen from above anti-clockwise, such that the wheels 11 to 12 are steered to progress according to the path of the transport equipment substantially straight with respect to the previous direction of progress of the transport equipment. In such a case, the body 8 and, correspondingly, the axis formed by the steerable wheels 11 to 12 of the trailer of the transport equipment have turned to the right, as seen from above clockwise. For the sake of clarity, the figure shows the trailer of the transport equipment with no transport box.

Figure 5:
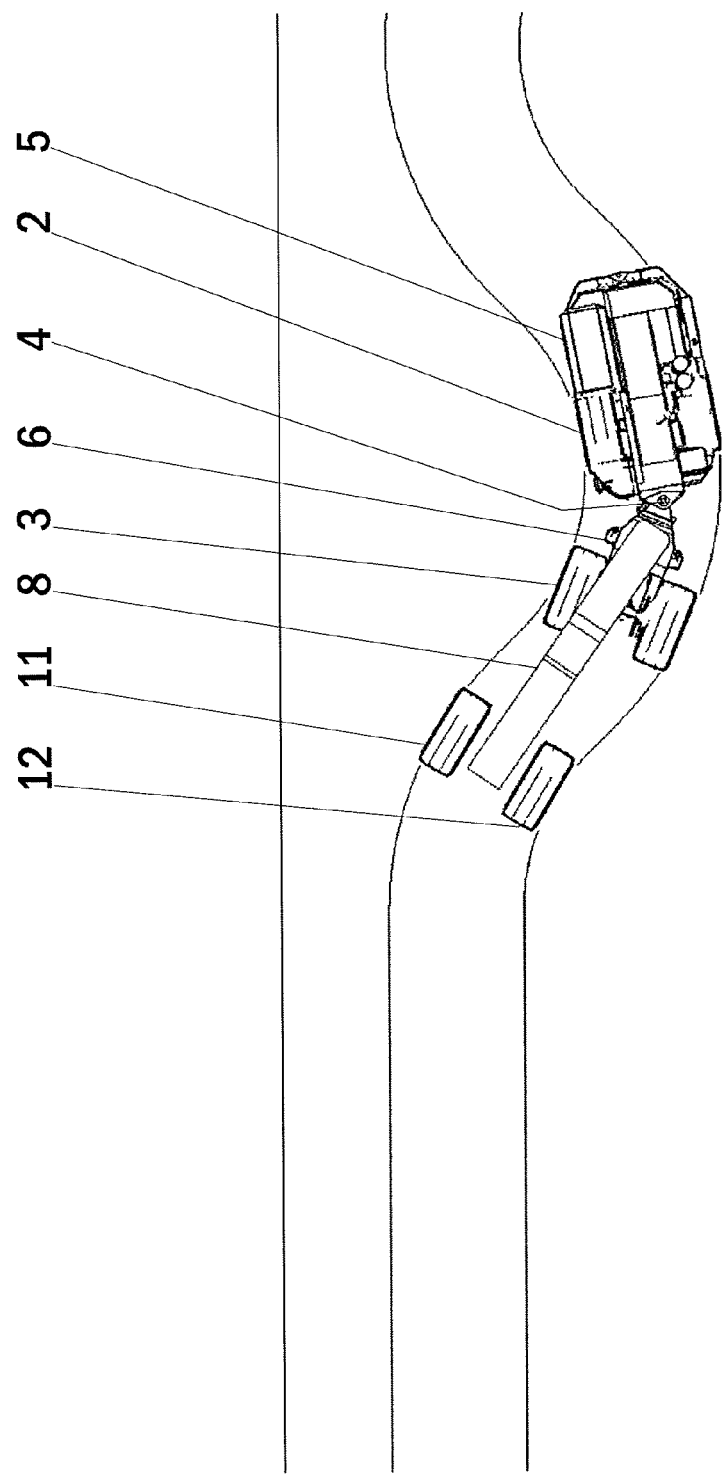
FIG. 5 illustrates, as seen from above, progress of articulated transport equipment according to an embodiment of the invention when it turns to the left after having turned to the right.

FIG. 5 illustrates, as seen from above, progress of articulated transport equipment according to an embodiment of the invention when it turns to the left after having turned to the right. When turning to the left after having turned to the right, the articulated transport equipment according to the invention turns by its centre articulation 4 such that the front body part 5 of the transport equipment turns to the left, as seen from above anti-clockwise with respect to the rear body part 6. In such a case, the front axle 2 of the transport equipment has turned to the left, as seen from above anti-clockwise, while the rear axle 3 has already also turned to the left with respect to the previous di-reaction of progress of the transport equipment. When turning to the left, the body 8 of the trailer of the transport equipment follows the rear body part 6 of the transport equipment straight in the previous direction of progress.

The steerable wheels 11 to 12 of the trailer of articulated transport equipment according to the invention are steered to turn straight such that the wheels 11 to 12 are steered to progress according to the path of the transport equipment. In such a case, the axle of the steerable wheels 11 to 12 of the trailer is substantially perpendicular to the previous direction of progress of the transport equipment. For the sake of clarity, the figure shows the trailer of the transport equipment with no transport box.

Figure 6:
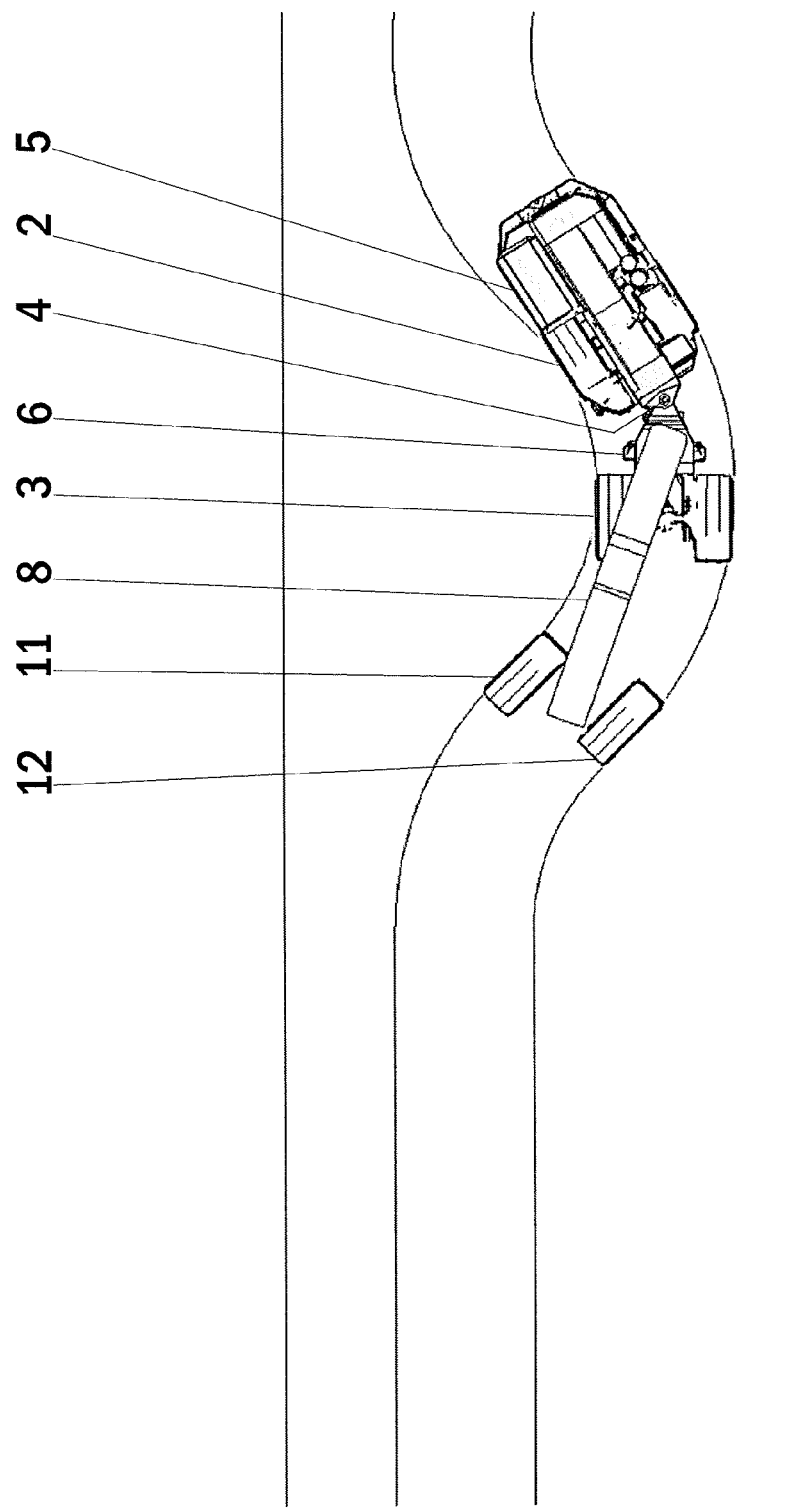
FIG. 6 illustrates, as seen from above, progress of articulated transport equipment according to an embodiment of the invention when it turns to the left.

FIG. 6 illustrates, as seen from above, progress of articulated transport equipment according to an embodiment of the invention when it turns to the left. When turning to the left, the articulated transport equipment according to the invention first turns by its centre articulation 4 such that the front body part 5 of the transport equipment turns to the left, as seen from above anti-clockwise with respect to the rear body part 6, whereafter the transport equipment starts to return by turning by its centre articulation 4 back such that the front body part 5 of the transport equipment starts to return to the right, clockwise with respect to the rear body part 6. In such a case, the front axle 2 and the rear axle 3 of the transport equipment have turned to the left with respect to the previous direction of progress of the transport equipment.

When turning to the left, in the articulated transport equipment according to the invention the body 8 of the trailer of the transport equipment follows the rear body part 6 of the transport equipment and turns to the left with respect to the previous direction of progress. In such a case, the steerable wheels 11 to 12 of the trailer of articulated transport equipment according to the invention are steered to turn to the right, as seen from above clockwise, such that the wheels 11 to 12 are steered to progress according to the path of the transport equipment substantially straight with respect to the previous direction of progress of the transport equipment. In such a case, the body 8 of the trailer of the transport equipment and, correspondingly, the axis formed by the steerable wheels 11 to 12 have turned to the left, as seen from above anti-clockwise. For the sake of clarity, the figure shows the trailer of the transport equipment with no transport box.

Figure 7:
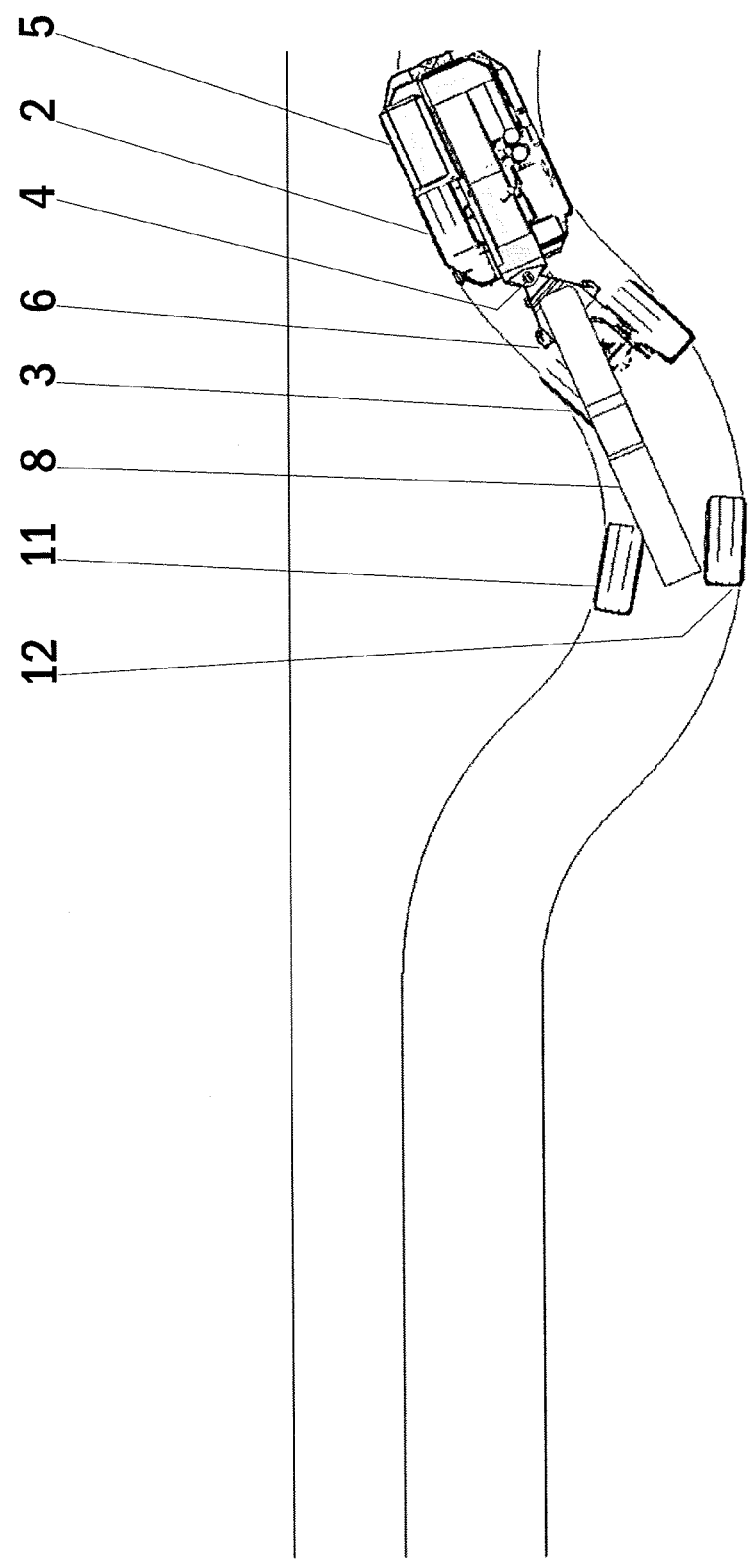
FIG. 7 illustrates, as seen from above, progress of articulated transport equipment according to an embodiment of the invention when it starts to turn to the right after having turned to the left.

FIG. 7 illustrates, as seen from above, progress of articulated transport equipment according to an embodiment of the invention when it starts to turn to the right after having turned to the left. When starting to turn to the right after having turned to the left, the articulated transport equipment according to the invention turns by its centre articulation 4 such that the front body part 5 of the transport equipment turns to the right, as seen from above clockwise with respect to the rear body part 6. In such a case, the front axle 2 of the transport equipment has turned to the right, as seen from above clockwise, while the rear axle 3 is still turned to the left with respect to the direction of progress of the transport equipment.

When starting to turn to the right after having turned to the left, the body 8 of the trailer of the transport equipment follows the rear body part 6 of the transport equipment and turns to the left with respect to the previous direction of progress. In such a case, the steerable wheels 11 to 12 of the trailer of articulated transport equipment according to the invention are steered to turn to the right, as seen from above clockwise, such that the wheels 11 to 12 are steered to progress according to the path of the transport equipment substantially straight with respect to the previous direction of progress of the transport equipment. In such a case, the body 8 of the trailer of the transport equipment and, correspondingly, the axis formed by the steerable wheels 11 to 12 have turned to the left, as seen from above anti-clockwise. For the sake of clarity, the figure shows the trailer of the transport equipment with no transport box.

Figure 8:
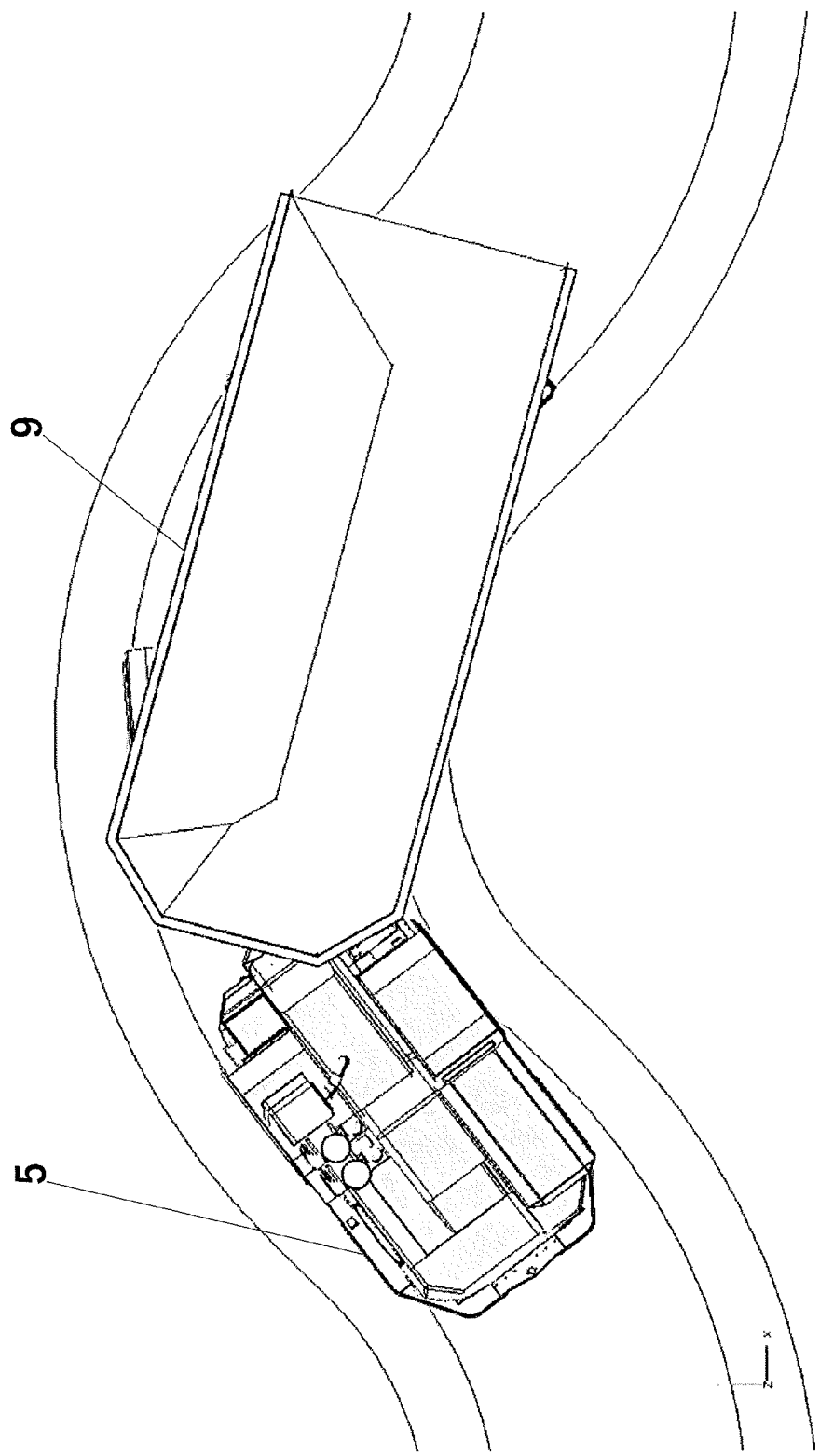
FIG. 8 illustrates, as seen from above, progress of articulated transport equipment according to an embodiment of the invention when the transport equipment is provided with a transport box and turning to the left.

FIG. 8 illustrates, as seen from above, progress of articulated transport equipment according to an embodiment of the invention when it is provided with a transport box and turning to the left. The figure excellently shows the smallness of the space required by the front body part 5, the rear body part and the transport box 9 of the trailer of the transport equipment according to the invention upon turning. When turning to the left, the articulated transport equipment according to the invention first turns by its centre articulation such that the front body part 5 of the transport equipment turns to the left, as seen from above anti-clockwise with respect to the rear body part. The trailer of the transport equipment follows the rear body part of the transport equipment and turns to the left with respect to the previous direction of progress. The steerable wheels of the trailer of articulated transport equipment according to the invention are steered to turn to the right, as seen from above clockwise, such that the wheels are steered to progress according to the path of the transport equipment substantially straight with respect to the previous direction of progress of the transport equipment. The trailer of the articulated transport equipment according to the invention is steered to progress according to the path of the transport equipment. By means of the solution according to the invention, the articulated transport equipment provided with a transport box requires less space upon turning.

Figure 9:
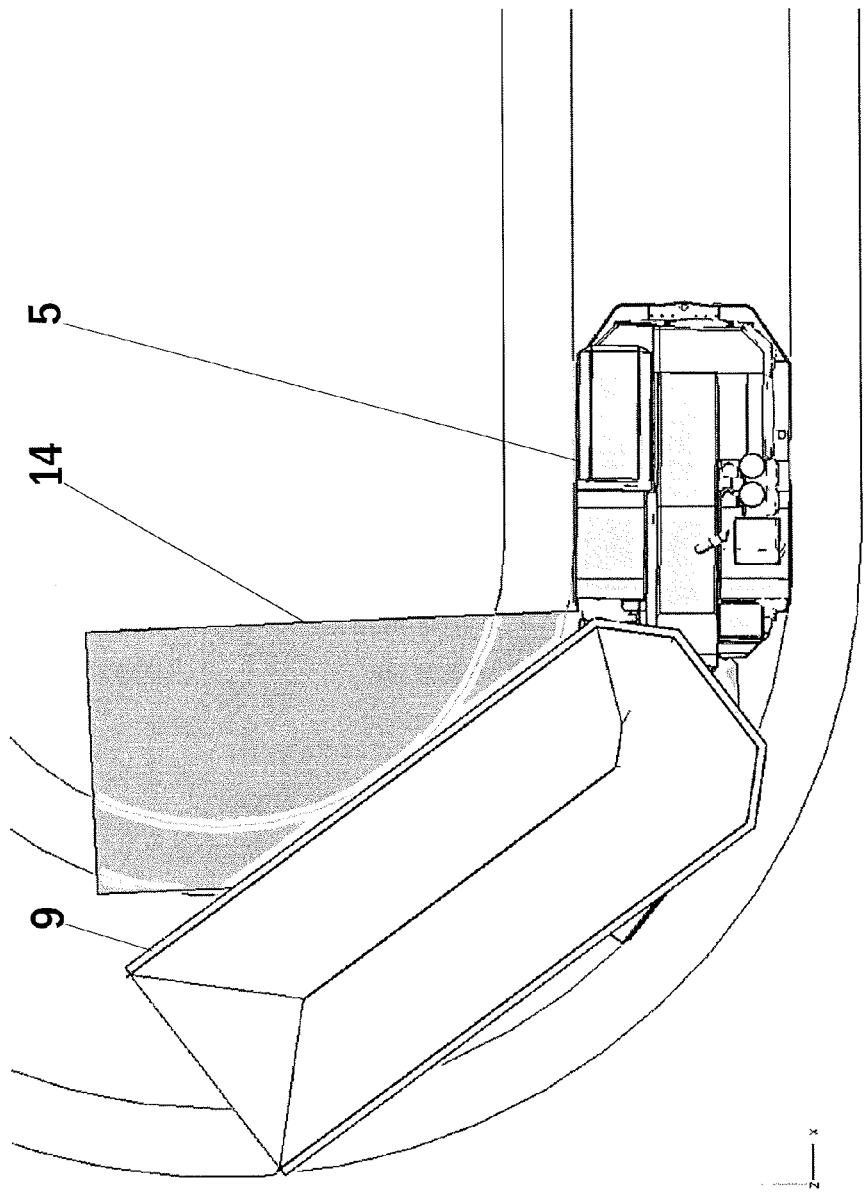
FIG. 9 illustrates, as seen from above, a need for space of articulated transport equipment according to an embodiment of the invention when the transport equipment is provided with a transport box and turning to the left.

FIG. 9 illustrates, as seen from above, a need for space of articulated transport equipment according to an embodiment of the invention when it is provided with a transport box and turning to the left. The figure excellently shows the space required by the front body part 5, the rear body part and the transport box 9 of the trailer of the transport equipment according to the invention upon turning. The trailer of the transport equipment follows the rear body part of the transport equipment and turns to the left with respect to the previous direction of progress. The steerable wheels of the trailer of the articulated transport equipment according to the invention are steered to turn to the right, as seen from above clockwise, such that the wheels are steered to progress according to the path of the transport equipment substantially straight with respect to the previous direction of progress of the transport equipment. The trailer of the articulated transport equipment according to the invention is steered to progress according to the path of the transport equipment. By means of the solution according to the invention, the articulated transport equipment provided with a transport box requires less space upon turning. The figure shows the need for space of the articulated transport equipment according to the invention as compared with a need for space 14 of a prior art solution, which is depicted in a shaded area. As can be seen in the figure, the trailer of the prior art transport equipment cuts across the curve considerably.

Figure 10:
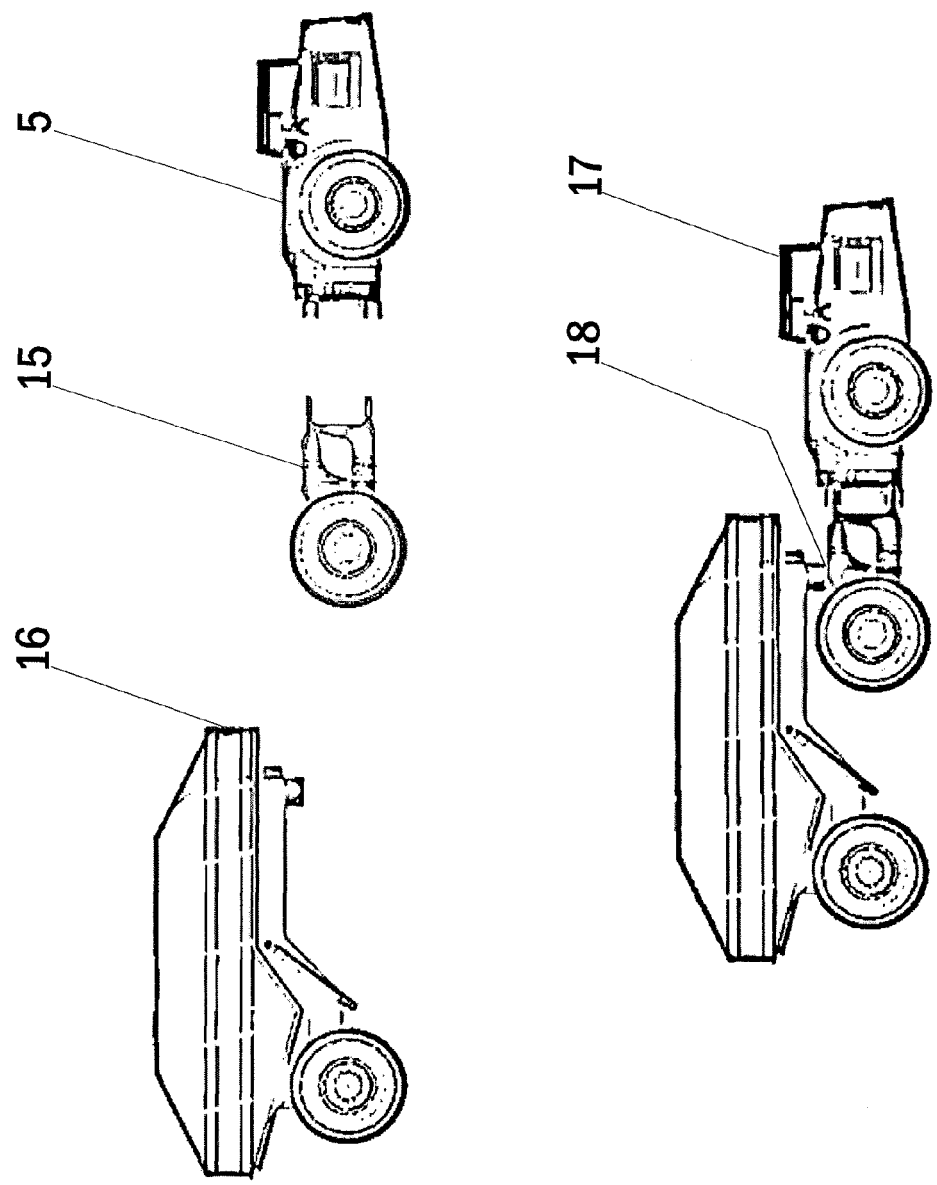
FIG. 10 is a side view showing a structure of articulated transport equipment according to an embodiment of the invention in parts and as a whole.

FIG. 10 is a side view showing a structure of articulated transport equipment according to an embodiment of the invention in parts and as a whole. The articulated transport equipment according to the invention comprises a front body part 5 of a body of the transport equipment, a rear body part 15 of the body of the transport equipment connectable to the front body part 5, and a trailer part 16 connectable to the rear body part 15. The trailer part 16 comprises a body of the trailer and a transport box of the trailer. The figure shows the articulated transport equipment consisting of parts also as a whole 17. The trailer part 16 of the articulated transport equipment 17 according to the invention is connected to the rear body part 15 of the body of the transport equipment 17 by a fastening articulation 18.

Figure 11:
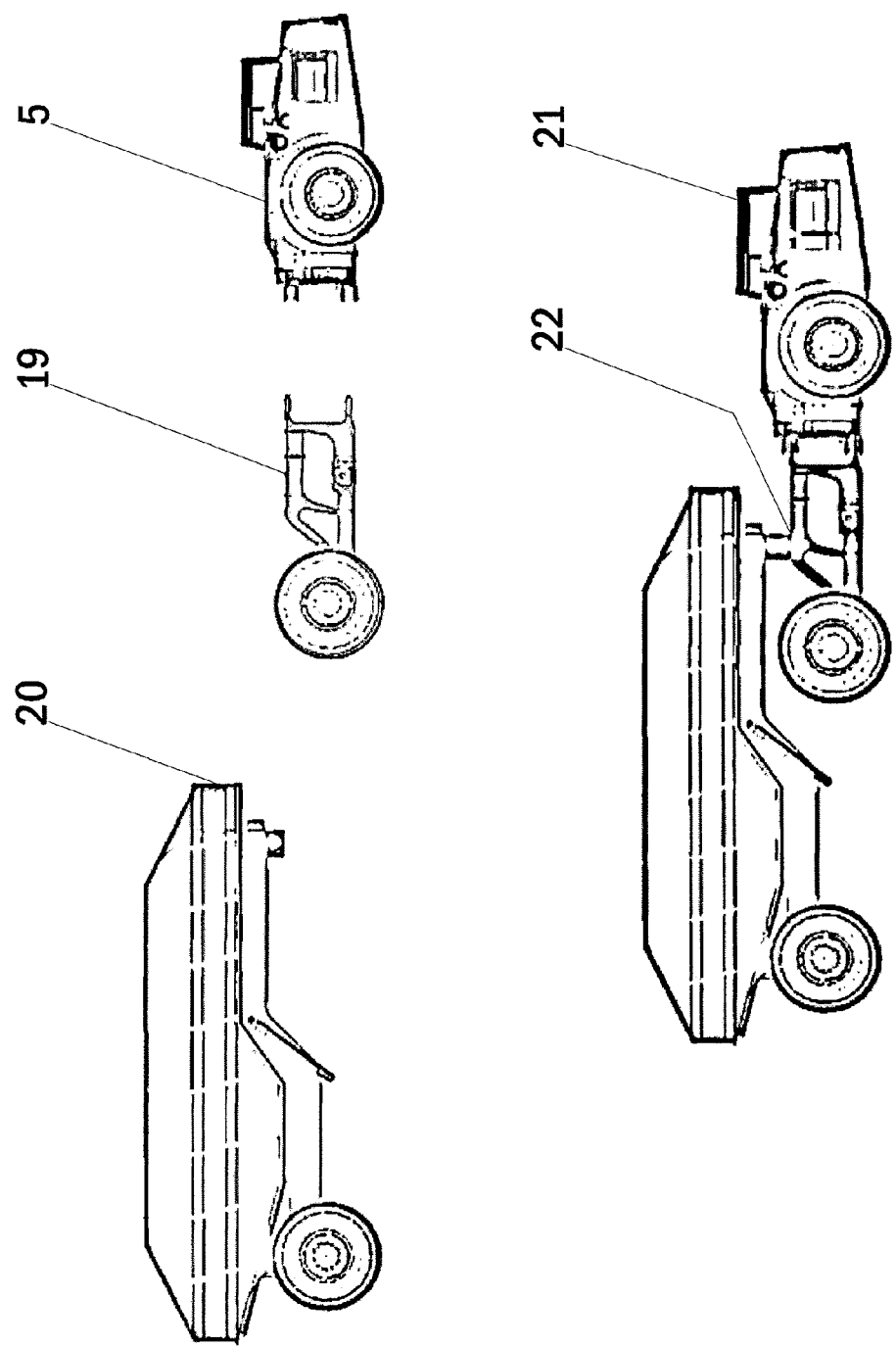
FIG. 11 is a side view showing a structure of articulated transport equipment according to an alternative embodiment of the invention in parts and as a whole.

FIG. 11 is a side view showing a structure of articulated transport equipment according to an alternative embodiment of the invention in parts and as a whole. The alternative articulated transport equipment according to the invention comprises a front body part 5 of a body of the transport equipment, a rear body part 19 of the body of the transport equipment connectable to the front body part 5, and a trailer part 20 connectable to the rear body part 19. The trailer part 20 comprises a body of the trailer and a transport box of the trailer. The figure shows the alternative articulated transport equipment consisting of parts also as a whole 21. The trailer part 20 of the articulated transport equipment 21 according to the invention is connected to the rear body part 19 of the body of the transport equipment 21 by a fastening articulation 22. The alternative articulated transport equipment 21 according to the invention is longer in dimension than the articulated transport equipment 17 shown in FIG. 10.

As shown by way of example in FIGS. 10 and 11, the articulated transport equipment 17, 21 according to the invention may thus be implemented modularly such that the transport equipment 17, 21 may conveniently be dimensioned to suit a target of use by means of the appropriate parts 15 to 16, 19 to 20. Further, as shown by way of example in FIGS. 10 and 11, in the articulated transport equipment 17, 21 according to the invention, the placement of the fastening articulation 18, 22 of the rear body part 15, 19 may be selected appropriately according to the target of use and the trailer part 16, of the transport equipment 17, 21 to be connected. The dimensioning of the appropriate parts 15 to 16, 19 to 20 of the articulated transport equipment 17, 21 according to the invention and/or the appropriate placement of the fastening articulation 18, 22 of the rear body part 15, 19 enable advantages to be achieved in the use of the transport equipment 17, 21. One such advantage is the distribution of load uniformly across different axles, for instance.

The trailer of the articulated transport equipment according to the invention comprises a plurality of wheels, of which at least two are arranged to be steerable wheels 11 to 12. The steerable wheels 11 to 12 of the trailer of the articulated transport equipment according to the invention may be connected to the axles or the axle shafts. The trailer may also comprise more than one axle. The articulated transport equipment according to the invention may be implemented such that when the steerable wheels 11 to 12 are turned, only the steerable wheels 11 to 12 turn. Alternatively, the articulated transport equipment according to the invention may be implemented such that when the steerable wheels 11 to 12 are turned, only the axles or axle shafts connected to the steerable wheels 11 to 12 turn. Furthermore, alternatively, the articulated transport equipment according to the invention may be implemented such that when the steerable wheels 11 to 12 are turned, both the steerable wheels 11 to 12 and the axles or axle shafts connected thereto turn.

The articulated transport equipment according to the invention may be implemented such that when the transport equipment is driven ahead (cf. FIGS. 2 to 7), the wheels 11 to 12 of the trailer of the transport equipment are steered such that the trailer follows substantially the same path as the wheels of the transport equipment. The articulated transport equipment according to the invention may be implemented such that when the transport equipment is reversed backwards (cf. FIGS. 2 to 7 backwards), the wheels 11 to 12 of the trailer are steered such that the body of the transport equipment follows the path of the trailer. A combination of the articulated transport equipment and the trailer according to the invention is relatively easy and logical to reverse since the wheels are always turned in to a desired driving direction. The articulated transport equipment according to the invention may also comprise a reverse mirror to make reversing the transport equipment and trailer combination very similar to driving ahead. The solution according to the invention enables a significant advantage to be achieved, particularly in narrow mining tunnels, since the trailer barely cuts across curves.

The articulated transport equipment according to the invention may be implemented such that the vicinity of the wheels 11 to 12 of the trailer of the transport equipment is provided with sensors for measuring a distance between the trailer and a tunnel wall. Also other necessary sensors, such as sensors measuring rotation or inclination, may be provided in connection with the wheels 11 to 12 of the trailer of the transport equipment. In the articulated transport equipment according to the invention, information obtained from the sensors may be utilized for calculating turning angles of the wheels 11 to 12 of the trailer. The steering of the articulated transport equipment according to the invention may be implemented e.g. such that wheels of the articulated transport equipment that come first in a direction of movement are e.g. by means of the sensors steered to an appropriate path while the wheels of the subsequent axles are in their travel steered to follow the path of the first wheels of the articulated transport equipment as closely as possible.

The motor of the articulated transport equipment according to the invention may be an electric motor, a combustion motor, a hydraulic motor or any other device for producing a rotating moment. The power transmission of the transport equipment may include a gear system and necessary cardan axles, differential gears and other power transmission members for transmitting a rotating moment from the motor to the drive wheels. The transport equipment may also be provided with a control system comprising at least a first control unit configured to control actuators in the transport equipment in order to control and use the transport equipment.

Further, the articulated transport equipment according to the invention may include a data transfer unit by means of which the first control unit may establish a data transfer connection with a second control unit external to the transport equipment. The second control unit may reside e.g. in a control room which may be located outside the mine. The first control unit and the second control unit may be computers equipped with appropriate software. The first control unit and the second control unit may also comprise a route determination unit or route determination software. It is to be noted that the transport equipment may generally refer to various devices that are used for rock excavation operation in a surface or underground production area and that may also be used elsewhere than in actual mines.

In the articulated transport equipment according to an embodiment of the invention, the trailer comprises a plurality of wheels, of which at least two are arranged to be drive wheels. In such a case, the drive property of the drive wheels of the trailer may be implemented by motors of their own, such as pole motors or, alternatively, by means of the motor of the transport equipment and a separate power transmission.

In the articulated transport equipment according to the invention, the turning of the steerable wheels 11 to 12 of the trailer may, according to the use application, be implemented e.g. hydraulically, mechanically or electrically.

The articulated transport equipment according to the invention is designed such that the transport equipment enables modular design. The front body part 5 and the rear body part 6 of the body 1 of the articulated transport equipment according to the invention may be adapted to be compatible with one another and dimensioned according to different purposes. This enables different rear body parts 6 to be connected to a similar front body part 5 of the transport equipment. Correspondingly, the body 8 and the transport box 9 of the trailer of the articulated transport equipment according to the invention may be adapted to be compatible with one another and dimensioned according to different purposes. This enables trailers having different bearing capacity and also different power transmission packages to be connected to the transport equipment.

The suspension of the articulated transport equipment according to the invention may be implemented such that the front axle of the transport equipment is provided with springs. In the articulated transport equipment according to the invention, the trailer 7 oscillates from its fastening articulation 10 to the transport equipment, in which case a separate bogie lever arrangement may be omitted, when desired.

The articulated transport equipment according to the invention enables an extremely good load-bearing capacity to be achieved with respect to the space required for turning in a mining tunnel. The articulated transport equipment according to the invention progresses in curves in a snake-like manner, and the steerability and logical manageability of the transport equipment are very good. In the articulated transport equipment according to the invention, the load may readily be distributed evenly between the axles. The articulated transport equipment according to the invention has also a good stability. The centre of gravity of the articulated transport equipment according to the invention is extremely good also in the jack-knife position, which prevents the equipment from falling over.

The articulated transport equipment according to the invention enables similar structures to be utilized by transport equipment having differently-sized bearing capacities, i.e. the front body part 5 and the rear body part 6 of the body 1 of the transport equipment as well as the body 8 and the transport box 9 of the trailer of the transport equipment may be dimensioned according to different purposes. It is thus possible to connect trailers having different bearing capacities and also different power transmission packages to the transport equipment according to the invention. The suspension of the articulated transport equipment according to the invention is also easy to implement.

It is apparent to those skilled in the art that as technology advances, the basic idea of the invention may be implemented in many different ways. The invention and its embodiments are thus not restricted to the above-described examples but may vary within the scope of the claims. Different features may thus be omitted, modified or replaced by equivalents, and the features disclosed in the present application may be combined in order to provide various combinations.

The invention claimed is:

1. Transport equipment suitable for transporting excavated rock material in mines and in underground as well as surface excavation, the transport equipment comprising:
   a mobile transport equipment body comprising a plurality of wheels including at least one drive wheel and at least two wheels arranged to be first steerable wheels, and a transport equipment centre articulation which divides the body of the transport equipment into a front body part and a rear body part, the drive wheel located in the front body part and the first steerable wheels located in the rear body part, and steering of the transport equipment being implemented such that the front body part and the rear body part of the body are steered to rotate about the centre articulation with respect to one another by means of articulated steering; and
   a trailer connectable to the body of the transport equipment by a fastening articulation, the trailer comprising a trailer body, a trailer transport box, and a plurality of wheels of which at least two wheels are arranged to be second steerable wheels,
   wherein at least one of the first steerable wheels and the second steerable wheels are mounted for rotation to a common transverse axle, and
   wherein the common transverse axle is pivotable relative to the body about a vertical axis of the transport equipment or the trailer body to which it is attached to turn the transport equipment.

2. Transport equipment as claimed in claim 1, wherein the transport equipment is implemented such that when the steerable wheels are turned, only the common transverse axle turns.

3. Transport equipment as claimed in claim 1, wherein the transport equipment is implemented such that when the steerable wheels are turned, both the steerable wheels and the common transverse axle turns.

4. Transport equipment as claimed in claim 1, wherein the wheels of the trailer are arranged to be steered such that upon driving ahead, the trailer of the transport equipment follows substantially the same path as the wheels of the transport equipment and, correspondingly, upon reversing backwards, the body of the transport equipment follows the path of the trailer.

5. Transport equipment as claimed in claim 1, wherein in connection with the wheels of the trailer of the transport equipment, sensors are arranged for providing information to be utilized in calculating turning angles of the wheels of the trailer.

6. Transport equipment as claimed in claim 1, wherein the steering of the transport equipment is implemented such that wheels of the articulated transport equipment that come first in a direction of movement are steered to a suitable path while the wheels of the subsequent axles are in their travel steered to follow the path of the first wheels of the articulated transport equipment as closely as possible.

7. Transport equipment as claimed in claim 1, wherein the transport equipment comprises a control unit configured to control actuators in the transport equipment in order to control and use the transport equipment.

8. Transport equipment as claimed in claim 1, wherein turning the steerable wheels of the trailer is implemented hydraulically, mechanically or electrically.

9. Transport equipment as claimed in claim 1, wherein at least two of the wheels of the trailer of the transport equipment are arranged to be drive wheels.

10. Transport equipment as claimed in claim 1, wherein by means of appropriate parts, the transport equipment is modularly dimensioned to suit a target of use.

11. Transport equipment as claimed in claim 1, wherein a placement of a fastening articulation of the rear body part of the transport equipment is selected appropriately according to the target of use and/or the trailer part of the transport equipment to be connected.

12. Transport equipment as claimed in claim 1, wherein the front body part and the rear body part of the body of the transport equipment as well as the body and transport box of the trailer are arranged to be compatible with one another.

13. A trailer of transport equipment suitable for transporting excavated rock material in mines and in underground as well as surface excavation, the transport equipment comprising a mobile transport equipment body provided with a plurality of wheels, of which at least one is a drive wheel, and a transport equipment centre articulation which divides the body of the transport equipment into a front body part and a rear body part, the drive wheel located in the front body part, and steering of the transport equipment being implemented such that the front body part and the rear body part of the body are steered to rotate about the centre articulation with respect to one another by means of articulated steering, the trailer comprising:
- a trailer body;
- a trailer transport box;
- a plurality of wheels of which at least two are arranged to be steerable wheels; and
- a fastening articulation,
- wherein the trailer is connectable to the body of the transport equipment by the fastening articulation,
- wherein the steerable wheels are mounted for rotation to a common transverse axle, and
- wherein the common transverse axle is pivotable relative to the trailer body about a vertical axis to turn the transport equipment.

14. Transport equipment as claimed in claim 5, wherein the steering of the transport equipment is implemented such that wheels of the articulated transport equipment that come first in a direction of movement are steered by means of the sensors to a suitable path while the wheels of the subsequent axles are in their travel steered to follow the path of the first wheels of the articulated transport equipment as closely as possible.

* * * * *